United States Patent [19]
Tajima et al.

[11] Patent Number: 5,032,938
[45] Date of Patent: Jul. 16, 1991

[54] METHOD AND APPARATUS FOR CONTROLLING REEL-TO-REEL TAPE TRANSPORTATION

[75] Inventors: Fujio Tajima, Tsuchiura; Munetake Kanna; Kenji Toki, both of Odawara, all of Japan

[73] Assignee: Hitachi, Ltd., Tokyo, Japan

[21] Appl. No.: 198,205

[22] Filed: May 25, 1988

[30] Foreign Application Priority Data

May 29, 1987 [JP] Japan ............................ 62-131214
Sep. 16, 1987 [JP] Japan ............................ 62-229571

[51] Int. Cl.$^5$ .................... G11B 15/46; B65H 59/00
[52] U.S. Cl. ...................... 360/73.09; 360/73.04; 242/75.5
[58] Field of Search ............ 360/71, 73.02, 73.01, 360/73.04, 73.08, 73.09, 73.14, 73.01; 318/6, 7; 242/75.5, 75.51, 186

[56] References Cited

U.S. PATENT DOCUMENTS

| 3,584,805 | 6/1971 | Lee | 318/7 X |
|---|---|---|---|
| 4,125,881 | 11/1978 | Eige et al. | 360/50 |
| 4,448,368 | 5/1984 | Skalko | 242/186 |
| 4,525,654 | 6/1985 | Tajima et al. | 318/7 |
| 4,531,166 | 7/1985 | Anderson | 360/73.04 |
| 4,644,436 | 2/1987 | Unno | 360/71 |
| 4,788,606 | 11/1988 | Uchikoshi | 318/7 X |

FOREIGN PATENT DOCUMENTS 0177550 10/1983 Japan ............................ 360/73.14
0131362 6/1988 Japan ............................ 360/73.09

OTHER PUBLICATIONS

IBM Technical Disclosure Bulletin, vol. 14, No. 2, Jul. 1971, Tape Reel Motor Control System, Werner.
IBM Technical Disclosure Bulletin, vol. 14, No. 6, Nov. 1971, Electronic Tape Speed Control, Penny.

Primary Examiner—Robert S. Tupper
Assistant Examiner—Andrew L. Sniezek
Attorney, Agent, or Firm—Antonelli, Terry, Stout & Kraus

[57] ABSTRACT

A magnetic head is provided in a tape transport path along which a magnetic tape is transported from one reel directly to another reel. In order to record or reproduce data to or from the magnetic tape with the magnetic head while the magnetic tape travels, it is necessary to stabilize a tape velocity at the magnetic head position to a desired velocity. The tape velocity at the magnetic head position is determined based on tape velocities at the respective reel positions, a tape path length from the head to one reel and a tape path length from the head to the other reel, and a closed loop control is effected by using the tape velocity at the magnetic head position to match the tape velocity to a desired velocity.

7 Claims, 7 Drawing Sheets

METHOD AND APPARATUS FOR CONTROLLING REEL-TO-REEL TAPE TRANSPORTATION

BACKGROUND OF THE INVENTION

The present invention relates to an apparatus for transporting a tape (for example, magnetic tape) from a reel directly to another reel, and more particularly to a method and apparatus for controlling tape transportation suitable for high speed and high precision tape transportation.

In a prior art apparatus such as that disclosed in U.S. Pat. No. 4,125,881, a current command to correct a tape velocity and a current command to correct a tape tension are separately issued to a reel drive system. However, a relationship between those two current commands is not clear but they are determined separately.

A direct reel-to-reel tape transportation apparatus without vacuum buffers in which respective reels are driven by two motors and the rotations of the motors are detected by tachometers to control a tape velocity spanned and transported between the reels to a predetermined velocity is also disclosed in U.S. Pat. No. 4,351,166 and U.S. Pat. No. 4,525,654. In those U.S. Patents, however, the relationship between the current commands for the motors to drive the reels is not clearly defined.

In the techniques of the above references, attention is not paid to a tape velocity and a tension in a vicinity of a magnetic head, and they have a problem in precision. For example, a measurement of a peripheral velocity of one reel is regarded as a tape velocity in the vicinity of the magnetic head. Further, since the current command to modify the tape tension is not always determined in accordance with a physical constant of the reel drive system, it is uncertain and imports unnecessary external force to the tape velocity.

SUMMARY OF THE INVENTION

It is an object of the present invention to provide a method and apparatus for controlling reel-to-reel tape transportation in which a tape unwound from one reel is taken up by the other reel, which can control a tape velocity with a high precision at a head position in a transport path.

It is another object of the present invention to provide a method and apparatus for controlling reel-to-reel tape transportation in which a tape is transported from one reel to the other reel without a buffer, which controls a tape velocity and a tape tension to desired levels with a high precision at a data read/write head position in a tape transport path.

In accordance with one feature of the present invention, the tape velocity at the head is calculated based on a measurement or estimation of an outermost peripheral tape velocity of the two reels (tape velocity at the reel position) and coefficients corresponding to tape transport path lengths between the reels and the head, and the calculated tape velocity is controlled to a desired velocity.

In accordance with another feature of the present invention, in the method for controlling the reel-to-reel tape transportation, the tape velocity in the vicinity of the head position in the tape transport path between the reels is determined based on an outermost peripheral tape speed of at least one of the two reels, a tape tension and coefficients corresponding to distances from the respective reels to the head, the calculated tape velocity is compared with a desired velocity and the motors are controlled to make the difference zero.

Other objects and features of the present invention will be apparent from the following description.

DESCRIPTION OF THE PREFERRED EMBODIMENTS

Figure 1:
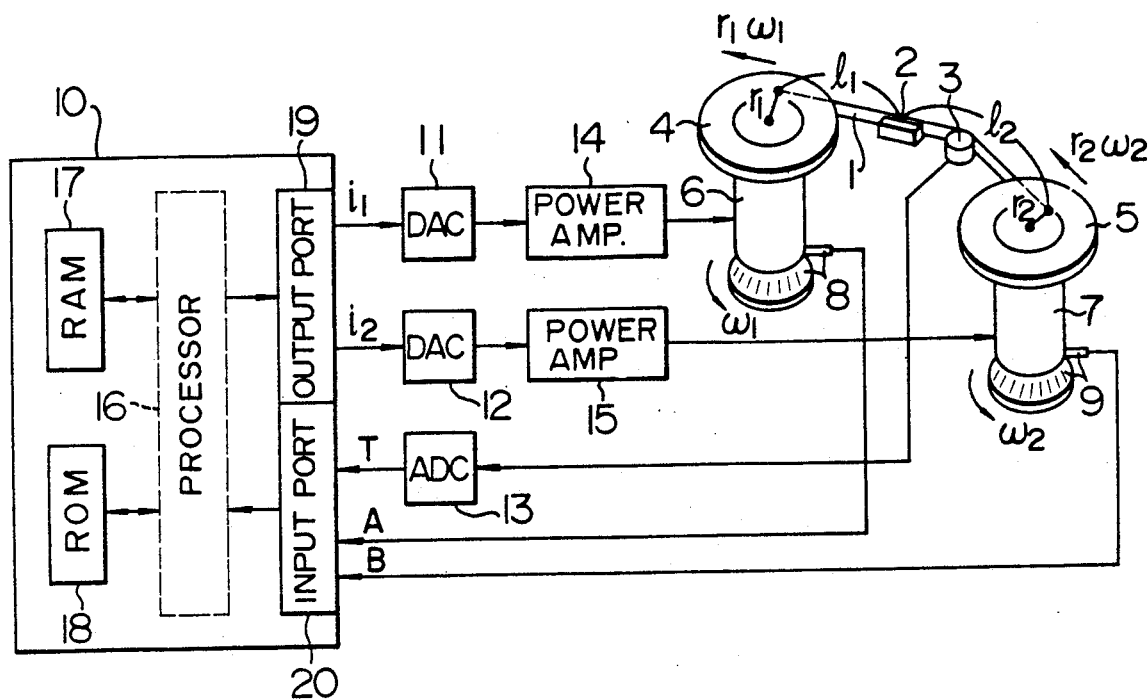
FIG. 1 shows a block diagram of one embodiment of the present invention.

FIG. 1 shows a block diagram of one embodiment of the present invention. In the present embodiment, a tape buffer such as a vacuum column is not provided but a digital controller 10 drives reel motors 6 and 7 by motor drive signals determined in a manner described hereinafter to rotate reels 4 and 5 so that a magnetic tape 1 is unwound from one reel, moves past a magnetic head 2 at a predetermined velocity and taken up by the other reel. The magnetic tape is transported contactlessly to mechanical parts between the reels.

The reel motors 6 and 7 are driven by drive currents supplied from power amplifiers 14 and 15 which are current amplifiers. Inputs to the power amplifiers 14 and 15 are outputs of D/A converters 11 and 12, which receive motor current commands $i_1$ and $i_2$ supplied from an output port 19 of the digital controller 10, and convert them to analog signals. The digital controller 10 controls the motors 6 and 7.

A fine tachometer 8 is mounted on the motor 6. It detects rotation of a take-up reel 4 directly coupled to the motor 6 to generate fine pulses A which are proportional in number to the rotation of the take-up reel 4. The fine pulses A are fed to an input port 20 of the digital controller 10. A fine tachometer 9 is mounted on the motor 7. It detects rotation of a supply reel 5 to produce fine pulses B which are proportional in number to the rotation of the supply reel 5. The fine pulses B are fed to the input port 20 of the digital controller 10.

A tension sensor 3 detects a tension of the magnetic tape 1 and produces measurement of the tape tension, which is supplied to an A/D converter 13, which converts the measurement of the tape tension to a digital signal output T, which in turn is fed to the input port 20 of the digital controller 10. The input port 20 of the digital controller 10 receives external signals A and B and the tape tension T and sends them to a processor 16, which controls the entire digital controller 10.

The digital controller 10 drives the reel motors 6 and 7, rotates the reels 4 and 5, determines the current commands $i_1$ and $i_2$ to control the tape velocity and tension of the magnetic tape 1 when it moves past the magnetic head 2 to the desired values, and supplies the commands to the D/A converters 11 and 12 through the output port 19. The processor 16 calculates control variables and constants necessary to determine the motor current commands based on a combination of state variables supplied through the input port 20 and mechanical constants previously stored in a read-only memory (ROM) 18. The output control parameters are sent to a random access memory (RAM) 17 at an appropriate timing to update the control variables and constants.

The digital controller 10 initially controls the tape tension T to a desired tension $T_{ref}$. It accelerates the tape 1 to a desired velocity $V_{ref}$ and then drives the tape 1 at a constant velocity. In this stage, data supplied from a controller (not shown) is recorded onto the tape 1 through the magnetic head 2. Or, data recorded on the tape 1 is read through the head 2 and the data is supplied to the controller. After the data recording or reproduction has been completed, the digital controller 10 decelerates the tape velocity to stop the tape 1. The series of operations are repeated each time the data is read or written. In those operations, the desired tension $T_{ref}$ is set to an optimum value determined by the material, thickness and length of the tape used. The desired velocity $V_{ref}$ is similarly set to an optimum value.

Figure 2:
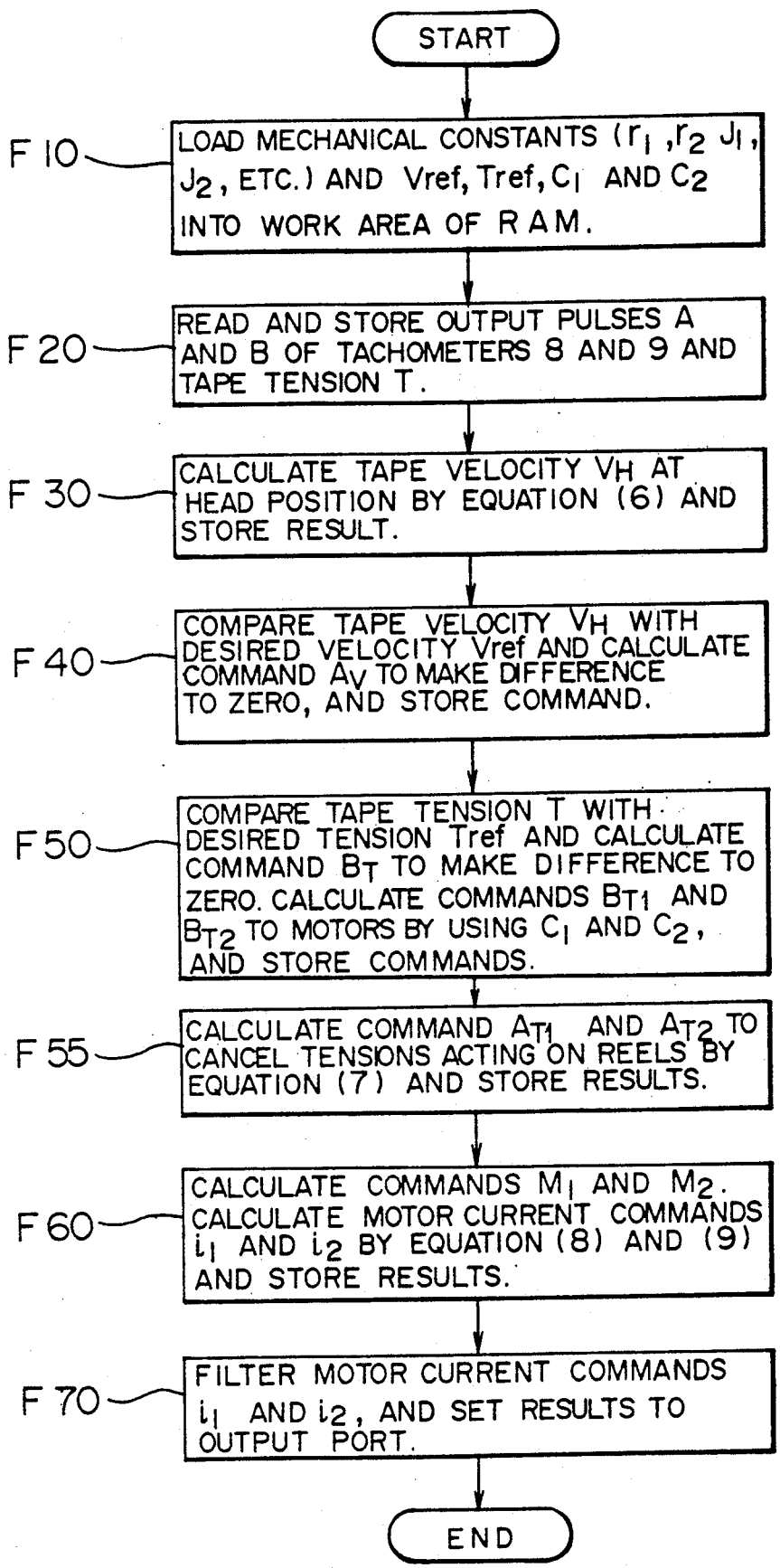
FIG. 2 shows an operation flow chart of the embodiment of FIG. 1.
Figure 3:
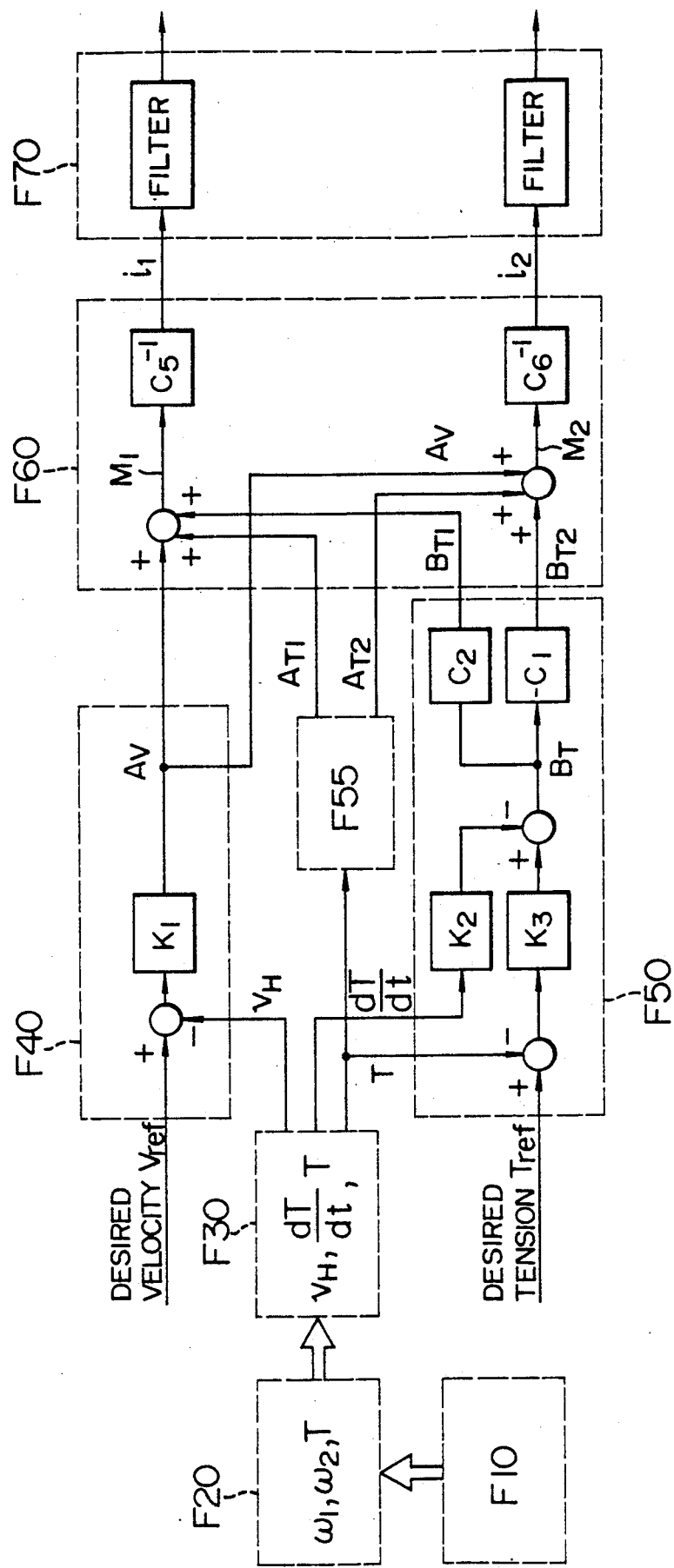
FIG. 3 shows a signal flow chart of signals of FIG. 2.

The operation of FIG. 1 is explained with reference to FIGS. 2 and 3. FIG. 2 shows an operational flow chart for determining the current command to the reel motors for controlling the tape velocity and tension at the head position to the predetermined values by the digital controller 10. It is executed at each predetermined sample time. FIG. 3 shows a signal flow chart equivalent to FIG. 2 to show a flow of signals in the digital controller 10. In FIG. 3, the steps corresponding to those of FIG. 2 are designated by like numerals.

A step F10 in FIGS. 2 and 3 is first executed. In the step F10, mechanical constants such as reel radii $r_1$ and $r_2$, total moments of inertia of the reel motors $J_1$ and $J_2$ and motor torque constants $K_T$, and coefficients $C_1$ and $C_2$ corresponding to distances from the reels to the head position, which are stored in the ROM 18 and RAM 17 of the digital controller 10 are loaded to the RAM 17 before the tape 1 is transported. The desired tension $T_{ref}$, desired velocity $V_{ref}$ and tape spring constant $K_S$ which are determined based on the cartridge information of the tape used such as thickness and length of the tape are selected and they are loaded to the work area of the RAM 17.

Methods for determining a radius and a moment of inertia which varies as the tape is transported are explained. The radius may be calculated using any suitable algorithm. In the present embodiment, it is calculated taken up during one revolution of the take-up reel 4 is equal to the length of tape supplied from the supply reel 5, the equation (1) is met. Since a sum of the lengths of tape wound on the respective reels is constant, the equation (2) is met.

$$2\pi r_1 = 2\pi r_2 \frac{n_2}{N} \tag{1}$$

$$\pi(r_1^2 - r_0^2) + \pi(r_2^2 - r_0^2) = C_o \tag{2}$$

where
- $r_1$: radius of the reel 4
- $r_2$: radius of the reel 5
- $n_2$: number of fine pulses B produced during one revolution of the reel 5
- $N$: number of pulses generated in one revolution of the fine tachometers 8 and 9
- $r_0$: initial reel radius when no tape is wound on the reel
- $C_o$: constant By solving the equations (1) and (2), the radii of the reels are determined as shown with the equation (3), by the count $n_2$ as a variable.

$$r_1 = \frac{n_2}{N} \cdot r_2 \tag{3}$$

$$r_2 = \left( \frac{2r_0^2 + \frac{C_o}{\pi}}{1 + \left(\frac{n_2}{N}\right)^2} \right)^{\frac{1}{2}}$$

The processor 16 calculates the radii of the reels in accordance with the equation (3). The calculation is made each time a new count $n_2$ is determined, by using the fine pulses A and B of the fine tachometers 8 and 9 supplied through the input port 20. The constants $\pi$, $r_0$, $C_o$ and $N$ required for the calculation are previously stored in the ROM 18.

Then, the total moments of inertias of the motors $J_1$ and $J_2$ are calculated using the radii $r_1$ and $r_2$, as shown by the equation (4).

$$\left. \begin{array}{l} J_1 = J_{10} + \frac{1}{2} \pi \rho W(r_1^4 - r_0^4) \\ J_2 = J_{20} + \frac{1}{2} \pi \rho W(r_2^4 - r_0^4) \end{array} \right\} \tag{4}$$

where
- $J_{10}$: inertia of the reel 4 including the motor
- $J_{20}$: inertia of the reel 5 including the motor
- $\rho$: density of the tape
- $W$: width of the tape The processor 16 calculates $J_1$ and $J_2$ in accordance with the equation (4) by using the mechanical constants $J_{10}$, $J_{20}$, $\rho$, $W$ and $r_0$ stored in the ROM 18 and the reel radii $r_1$ and $r_2$ stored in the RAM 17, and stores the result into the RAM 17. Those values are updated each time the reel radii $r_1$ and $r_2$ are updated.

Then, in a step F20, in order to obtain state variables necessary to calculate the tape velocity and tension at the head position, the processor 16 reads the fine pulses A and B from the fine tachometers 8 and 9 and the output T from the A/D converter 13, through the input port 20. In the embodiment of FIG. 1, angular velocities $\omega_1$ and $\omega_2$ of the motors and the tape tension T are used as the state variables. The angular velocities $\omega_1$ and $\omega_2$ are determined by the equation (5). They are updated each time new $t_1$ and $t_2$ are determined based on the fine pulses A and B supplied through the input port 20.

$$\omega_1 = \frac{2\pi}{Nt_1}, \quad \omega_2 = \frac{2\pi}{Nt_2} \tag{5}$$

where
- $t_1$: pulse time interval of the fine pulses A
- $t_2$: pulse time interval of the fine pulses B The tape velocity $V_H$ at the position of the magnetic head 2 is affected by the tape velocity ($r_1 \cdot \omega_1$) on the outermost periphery of the reel 4 and the tape velocity ($r_2 \cdot \omega_2$) on the outermost periphery of the reel 5, and is determined by constants $C_1$ and $C_2$ which include the distances from the respective reels as variables.

$$V_H = \frac{l_2}{l_1 + l_2} r_1 \cdot \omega_1 + \frac{l_1}{l_1 + l_2} r_2 \cdot \omega_2 \quad (6)$$
$$= C_1 \cdot r_1 \cdot \omega_1 + C_2 \cdot r_2 \cdot \omega_2$$

where
$l_1$: distance between the reel 4 and the head 2 in the tape transport path
$l_2$: distance between the reel 5 and the head 2 in the tape transport path In a step F30, the processor 16 calculates the tape velocity $V_H$ at the head position in accordance with the equation (6) by using the values $C_1$, $C_2$, $\omega_1$, $\omega_2$, $r_1$ and $r_2$ obtained in the steps F10 and F20, and stores the result. The calculation is made at each sampling time of the digital controller 10 and updated each time $r_1$, $r_2$, $\omega_1$ and $\omega_2$ are updated.

Then, a step F40 is executed. In the step F40, a difference between the tape velocity $V_H$ at the head position and the desired velocity $V_{ref}$ is calculated, and the difference is multiplied by a velocity gain $K_1$, and an amended velocity command $A_V$ to render the difference to zero is calculated and stored in the RAM 17.

Then, a step F50 is executed. In the step F50, a difference between the tension T and the desired tension $T_{ref}$ is calculated, and the difference is multiplied by a tension gain $K_3$. A differentiation of the tension $dT/dt$ is also multiplied by a gain $K_2$. An amended tension command $B_T$ to render the tension difference to zero is calculated by using the above products. The reason for using the differentiation of the tension is to stabilize the servo system. Commands $B_{T1}$ ($=B_T \cdot C_2$) and $B_{T2}$ ($=-B_T \cdot C_1$) to the reel drive motors are calculated by using the amended tension command $B_T$ and the coefficients $C_1$ and $C_2$, and they are stored.

For example, when the magnetic head is at a substantially mid-point of the reels, the coefficients $C_1$ and $C_2$ are $C_1 = 0.5$ and $C_2 = 0.5$, and a proportion of the amended tension command to the motor 6 including the reel 4 is 0.5 and a proportion of the amended tension command to the motor 7 including the reel 5 is $-0.5$. When the magnetic head is very close to the reel 4, the coefficients $C_1$ and $C_2$ are $C_1 = 1.0$ and $C_2 = 0$, and the amended tension command is exclusively distributed to the motor 7 including the reel 5.

In a step F55, commands $A_{T1}$ and $A_{T2}$ to cancel external forces (due to the tape tension) acting on the reels 4 and 5 are calculated. The commands $A_{T1}$ and $A_{T2}$ are calculated in accordance with the equation (7).

$$\left. \begin{array}{l} A_{T1} = \dfrac{r_1^2}{J_1} T \\[4pt] A_{T2} = \dfrac{-r_2^2}{J_2} T \end{array} \right\} \quad (7)$$

The processor 16 calculates $A_{T1}$ and $A_{T2}$ in accordance with the equation (7) by using the constants and variables obtained and stored in the steps F10 and F30, and stores the result.

In a step F60, a command $M_1$ to amend the tape velocity or tension for the motor 6 is determined by adding $A_v$, $A_{T1}$ and $B_{T1}$. Similarly, a command $M_2$ for the motor 7 is determined by adding $A_v$, $A_{T2}$ and $B_{T2}$. Then, the current commands $i_1$ and $i_2$ to the motors are calculated by using $M_1$ and $M_2$ and the mechanical constants ($r_1$, $r_2$, $J_1$, $J_2$ and $K_T$) and they are stored in the RAM 17. The current commands $i_1$ and $i_2$ are calculated by:

$$i_1 = \frac{1}{C_5} \cdot M_1 \quad (8)$$

$$i_2 = \frac{1}{C_6} \cdot M_2 \quad (9)$$

where, $$C_5 = \frac{r_1 K_T}{J_1}, \ C_6 = \frac{r_2 K_T}{J_2}$$

In a step F70, the motor current commands $i_1$ and $i_2$ are filtered to eliminate high order mechanical vibrations included in the magnetic tape apparatus. The processor 16 filters the current commands by a filtering process stored in the ROM 18, for example, by a low-pass filter or a notch filter by using the mechanical constants, and outputs the result through the output port 19. The high order mechanical vibration due to a motor shaft vibration between the reel and the motor, and a frequency of the vibration depends on a load inertia of the reel and a motor moment of inertia. Since the mechanical constant obtained in the step F10 has already been updated to correspond to the actual reel load inertia, the filtering process of the step F70 is an optimum to eliminate the actual high order mechanical vibration. As a result, a center frequency of the filter is continuously updated as the amounts of tapes on the reels change.

The current commands $i_1$ and $i_2$ thus obtained are supplied to the D/A converters 11 and 12 and amplified by the amplifiers 14 and 15 which produce the motor drive currents, which are supplied to the motors 6 and 7 to control the rotations of the motors 6 and 7 so that the velocity and tension of the tape transported from the reel 5 to the reel 4 are controlled to the desired values.

Figure 4:
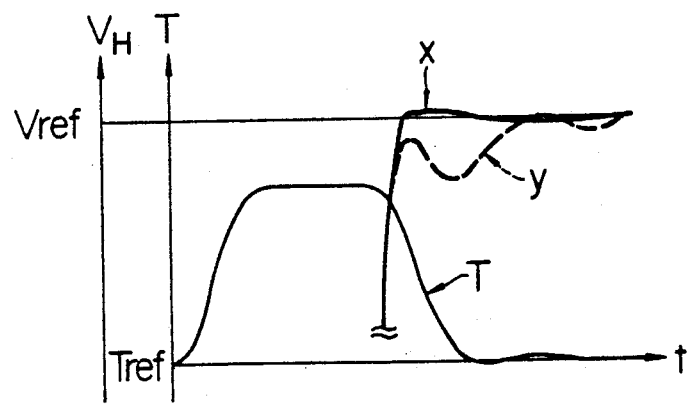
FIG. 4 shows response characteristics of time response waveforms for tape velocity and tape tension.

FIG. 4 shows a comparison of the tape transport control in the present embodiment and the prior art tape transport control. FIG. 4 shows measurements of the tape velocity $V_H$ at the magnetic head position and the tape tension T when the tape is accelerated from the stationary state to the desired velocity $V_{ref}$. A curve x shows the measurement in the present embodiment, and a curve y shows that in the prior art apparatus. In the curve x, the tape velocity is stably accelerated to $V_{ref}$ in spite of the variation in the tape tension T. In the curve y, the tape velocity is significantly disturbed by the affect of the change in the tape tension T, and a long time is required before the tape velocity is stabilized. If the tape velocity at the head position reaches the desired velocity and stabilizes thereat in a short time, it means that a waiting time before it is permissible to record data on the tape through the head or read the data recorded on the tape through the head is reduced. This is not only desirable for the correct recording and reproduction of data but also advisable in that it permits increase of a recording density of the tape. In the present embodiment, the filtering process to eliminate the high order mechanical vibration such as motor shaft vibration is effected depending on the amounts of tapes on the reels. As a result, the vibration is reduced at any portion of the reel-to-reel tape transportation from the beginning to the end of the tape, and very stable tape transportation is attained.

In the present embodiment, the coefficients $C_1$ and $C_2$ are selected in accordance with the distances $l_1$ and $l_2$ between the magnetic head and the reels in the tape transport path. In the actual arrangement of the reels and head, the head is in many cases at a substantially mid-point of the reels ($l_1 \approx l_2$). Accordingly, $C_1 = C_2 = 0.5$ and the velocity $V_H$ can be determined by using $\omega_1 \cdot r_1$ and $\omega_2 \cdot r_2$ as follows.

$$V_H = (\omega_1 \cdot r_1 + \omega_2 \cdot r_2) \times 0.5$$

and the velocity can be controlled by using the velocity $V_H$ determined above. That is, a mean value of the tape velocities on the outermost peripheries of the respective reels may be used for the velocity control. In this case, the tape velocity $V_H$ at the magnetic head position can be estimated even in a situation where the tape transport path lengths between the head and the reels are hard to determine and precise velocity control and tension control can be attained.

Figure 5:
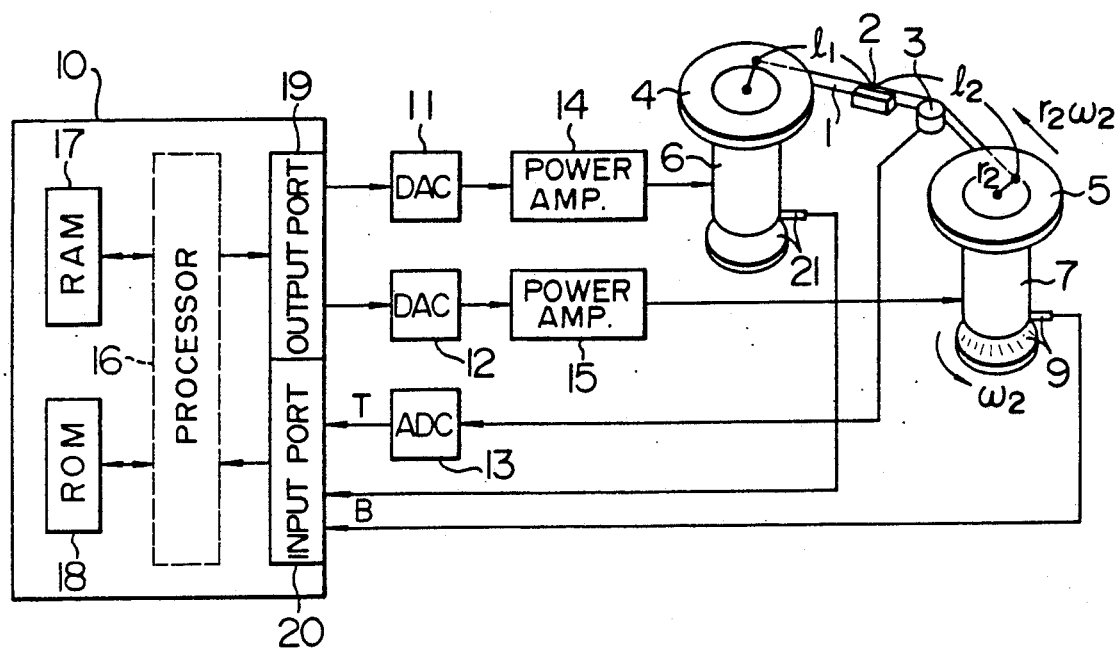
FIGS. 5, 6, 7, 8 and 9 show block diagrams of other embodiments of the present invention.

Another embodiment of the present invention is now explained. FIG. 5 shows another embodiment of the present invention. The embodiment of FIG. 5 is different from the embodiment of FIG. 1 in that the tachometer 8 is replaced by a tachometer 21 which produces one pulse per revolution. Other elements are identical to those of FIG. 1. By the above difference, the steps F20 and F30 of FIG. 2 which shows the operation of the digital controller 10 change. Other steps are identical to those of FIG. 2. In the present embodiment, a combination of the angular velocity $\omega_2$ of the motor 7 on the reel 5 and the tape tension T (measurement) is used to control the tape velocity $V_H$ and tension T at the magnetic head position. The processor 16 reads the fine pulses B from the fine tachometer 9 and the output T from the A/D converter 13 through the input port 20. The angular velocity $\omega_2$ of the motor 7 is calculated in accordance with the equation (5). The calculation is updated each time a new $t_2$ is determined based on the fine pulses B supplied through the input port 20.

The tape velocity $V_H$ at the head position is approximately given by the equation (10), and an equivalent velocity feedback value is determined.

$$V_H = r_2 \omega_2 + \frac{C_1}{K_S} \frac{dT}{dt} \quad (10)$$

where $C_1$: coefficient having the distance between the reel 4 and the magnetic head 2 as a variable
$r_2$: radius of the reel 5 including the tape
$\omega_2$: angular velocity of the motor 7 on the reel 5
$K_S$: tape spring constant The velocity and tension are controlled by using the tape velocity $V_H$ determined above, in the same manner as that of the steps F40 to F70 of FIG. 2, the explanation of which is omitted here.

A theoretical ground of the equation (10) is explained. The tape tension T generated between the tapes can be represented by a sum of an initial tension $T_0$ and a subsequently generated tension, as shown by $$T = T_0 + K_S (\int \omega_1 \cdot r_1 dt - \int \omega_2 \cdot r_2 dt) \quad (11)$$

where $K_S$: tape spring constant
From the equation (11), $\omega_1 \cdot r_1$ is represented by $$\omega_1 r_1 = \omega_2 \cdot r_2 + \frac{1}{K_S} \frac{dT}{dt} \quad (11)'$$

By substituting the equation (11') in the equation (6), the equation (10) is derived.

In the embodiment of FIG. 5, the same control performance as that of FIG. 1 is attained while saving the tachometer 8 of the motor 6.

Figure 6:
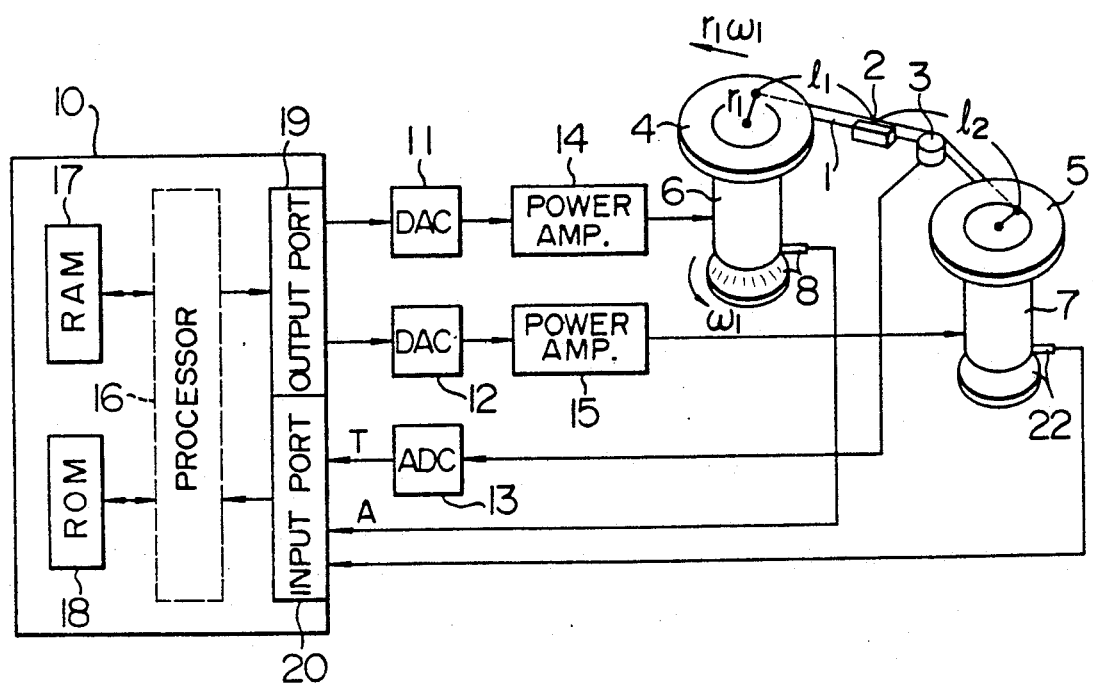

Another embodiment of the present invention is explained with reference to FIG. 6. It is different from the embodiment of FIG. 1 only in that the fine tachometer 9 is replaced by a tachometer 22 which produces one pulse per revolution. Accordingly, the operation is essentially identical to that shown in FIG. 2, except for the steps F20 and F30.

In the present embodiment, a combination of the angular velocity $\omega_1$ of the motor 6 for the reel 4 and the tape tension T is used to control the tape velocity and tension at the magnetic head position. The processor 16 reads the fine pulses A from the fine tachometer 8 and the output T from the A/D converter 13 through the input port 20. The angular velocity $\omega_1$ of the motor 6 is calculated in accordance with the equation (5). The calculation is updated each time a new $t_1$ is determined based on the fine pulses A supplied through the input port 20.

The tape velocity $V_H$ at the head position is calculated in accordance with the equation (12).

$$V_H = r_1 \omega_1 + \frac{C_2}{K_S} \frac{dT}{dt} \quad (12)$$

The velocity and tension are controlled by using the tape velocity $V_H$ determined above, in the same manner as that of FIG. 2, the explanation of which is omitted here. The theoretical ground of the equation (12) which represents the tape velocity at the magnetic head position is same as that of the embodiment of FIG. 5, the explanation of which is omitted here.

In accordance with the present embodiment, the same control performance as that of the embodiment of FIG. 1 is attained while saving the fine tachometer 9 of the motor 7.

Figure 7:
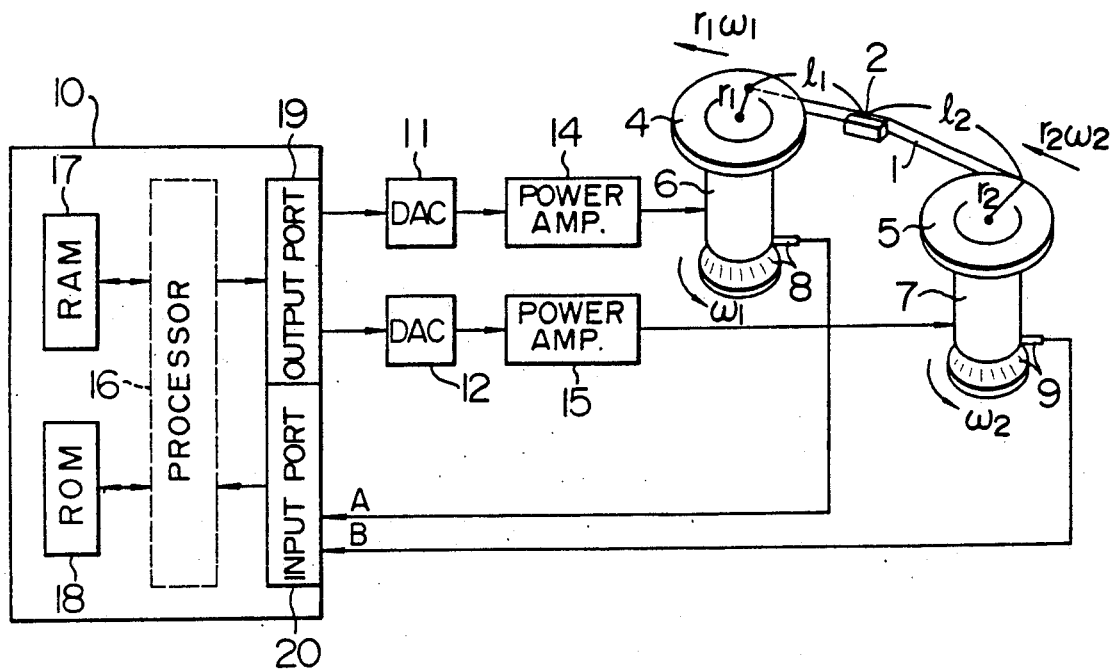

FIG. 7 shows another embodiment of the present invention. It is different from the embodiment of FIG. 1 only in that the tension sensor 3 is removed. Other elements are identical to those of FIG. 1. The operational flow chart for the digital controller 10 is essentially identical to that shown in FIG. 2 except for the step F20. This is explained below. In the present embodiment, only the angular velocities $\omega_1$ and $\omega_2$ of the motors 6 and 7 are used and the tape tension (measurement) is not used to control the tape velocity and tension at the magnetic head position. Accordingly, in the step F20 of FIG. 2, the tape tension T is not measured. The tape velocity at the head position is determined in the same manner as the step F30 of FIG. 2. In the embodiment of FIG. 7, the equation (11) is used to determine the tape tension because the tape tension is not directly detected. The differentiation of the tension is calculated by the equation (13).

$$\frac{dT}{dt} = K_S (r_1 \omega_1 - r_2 \omega_2) \quad (13)$$

The processor 16 controls the velocity and tension to the respective desired values by using the parameters determined above. Other control operations are same as those of FIG. 2, and the explanation thereof is omitted.

In accordance with the embodiment of FIG. 7, the control performance which is close to that of the embodiment of FIG. 1 is attained while saving the tape tension sensor.

Figure 8:
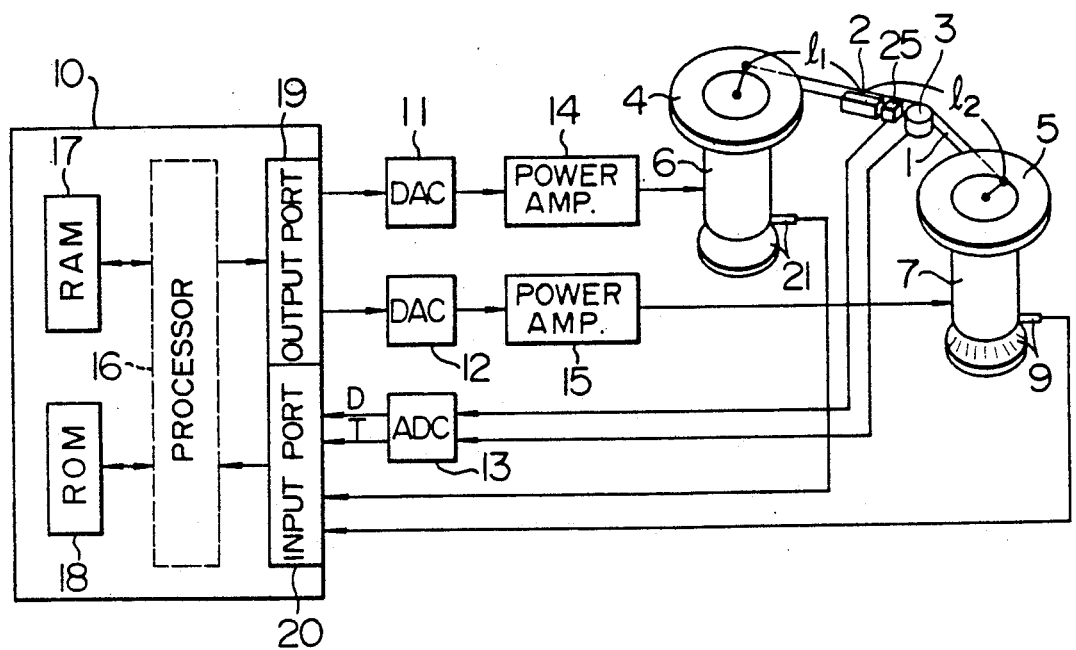

Another embodiment of the present invention is explained with reference to FIG. 8. It is different from the embodiment of FIG. 1 in that a velocity sensor 25 is provided in a vicinity of the magnetic head 2 and a pulse signal output of the velocity sensor 25 is supplied to the input port 20 through the A/D converter 13. Other elements are identical to those of FIG. 1. The operational flow chart of the digital controller 10 is essentially same as that shown in FIG. 2 except for the steps F20 and F30, which will be explained below. In the present embodiment, the direct measurement of the tape velocity and the tape tension (measurement) in the vicinity of the magnetic head are used to control the tape velocity and tension at the magnetic head position. The pulse signal of the velocity sensor 25 supplied through the input port 20 is converted to the tape velocity and it is stored. A position signal having a predetermined pitch l has previously been recorded on the magnetic tape 1, and the pitch l is stored in the ROM 18. The processor 16 calculates the tape velocity $V_H$ at the magnetic head position in accordance with the equation (14) by using fine pulses D supplied from the velocity sensor 25 through the input port 20, and determines an equivalent velocity feedback value and stores it.

$$V_H = \frac{l}{t_H} \tag{14}$$

where
l: pitch of the prerecorded signal on the tape
$t_H$: pulse time interval of the fine pulses D The tension T is same as that in the embodiment of FIG. 1, and the explanation thereof is omitted. The steps after $V_H$ and T have been determined are same as the steps F40-F70 of FIG. 2, and the explanation thereof is omitted. It is desirable that the velocity sensor be as close to the magnetic head as possible in order to control the tape velocity $V_H$ at the head position which is the primary object of the present invention. However, where the velocity sensor 25 cannot be mounted in the vicinity of the magnetic head, the measurement of the velocity sensor is corrected based on the coefficients which include the distances between the reels and the magnetic head as variables and the positional relationship between the velocity sensor and the magnetic head, as is done in the embodiment of FIG. 1, to improve the control performance.

Another embodiment of the present invention is explained with reference to FIG. 9. It is different from the embodiment of FIG. 1 in that the fine tachometer 8 is replaced by one tachometer 21 which produces a pulse per revolution, the tension sensor 3 and the A/D converter 13 are omitted, and fine tachometers 23 and 24 are mounted on the reels 4 and 5, respectively, and the outputs thereof are supplied through the input port 20. Other elements are identical to those of FIG. 1. The operational flow chart of the digital controller 10 is essentially the same as that shown in FIG. 2, except for the steps F20 and F30 which will be explained below. In the present embodiment, only the angular velocities $\omega_{1R}$ and $\omega_{2R}$ of the reels 4 and 5 are used and the tape tension T (measurement) is not used to control the tape velocity $V_H$ and tension T at the magnetic head position. The angular velocities $\omega_{1R}$ and $\omega_{2R}$ are determined in accordance with the equation (15). The calculation is effected each time output pulse times $t_1$ and $t_2$ of the fine tachometers 23 and 24 supplied through the input port 20 are determined so that $\omega_{1R}$ and $\omega_{2R}$ are updated.

$$\omega_{1R} = \frac{2\pi}{N_R t_{1R}}, \quad \omega_{2R} = \frac{2\pi}{N_R t_{2R}} \tag{15}$$

where
$t_{1R}$, $t_{2R}$: output pulse time intervals of the fine tachometers 23 and 24
$N_R$: number of pulses generated in one revolution of the fine tachometers 23 and 24

The equation (16) is calculated by using $\omega_{1R}$ and $\omega_{2R}$ to determine the tape velocity $V_H$ at the magnetic head position.

$$V_H = C_1 r_1 \omega_{1R} + C_2 r_2 \omega_{2R} \tag{16}$$

The calculation is effected at each sampling time of the digital controller 10, and the value is updated each time $r_1$, $r_2$, $\omega_{1R}$ and $\omega_{2R}$ are updated. On the other hand, the relation of the equation (17) is used to estimate the tape tension. The relation of the equation (18) is used in place of the differentiation of the tension.

$$T = T_0 + K_S \{\int r_1 \omega_{1R} dt - \int r_2 \omega_{2R} dt\} \tag{17}$$

$$dT/dt = K_X (r_1 \omega_{1R} - r_2 \omega_{2R}) \tag{18}$$

The processor 16 executes the steps F40-F70 of FIG. 2 by using the parameters determined above. The explanation thereof is omitted here.

Figure 9:
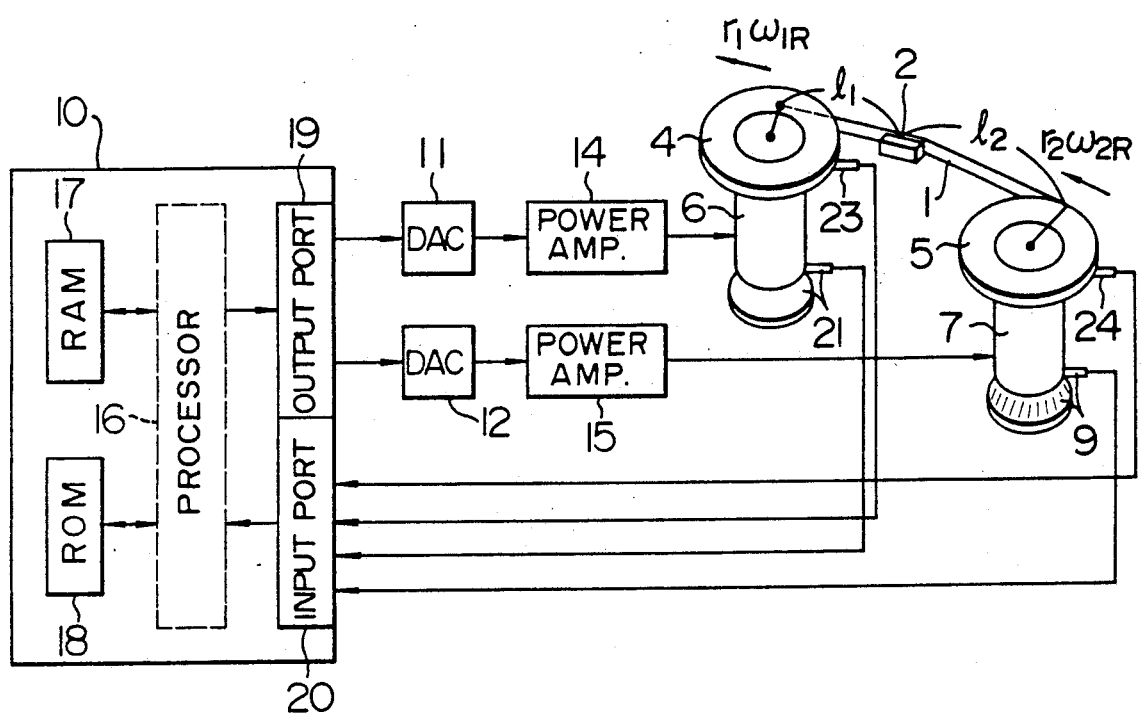

In accordance with the embodiment of FIG. 9, a higher control performance than the embodiment of FIG. 7 is attained because the approximation of the tape velocity and tension is more accurate.

Figure 10:
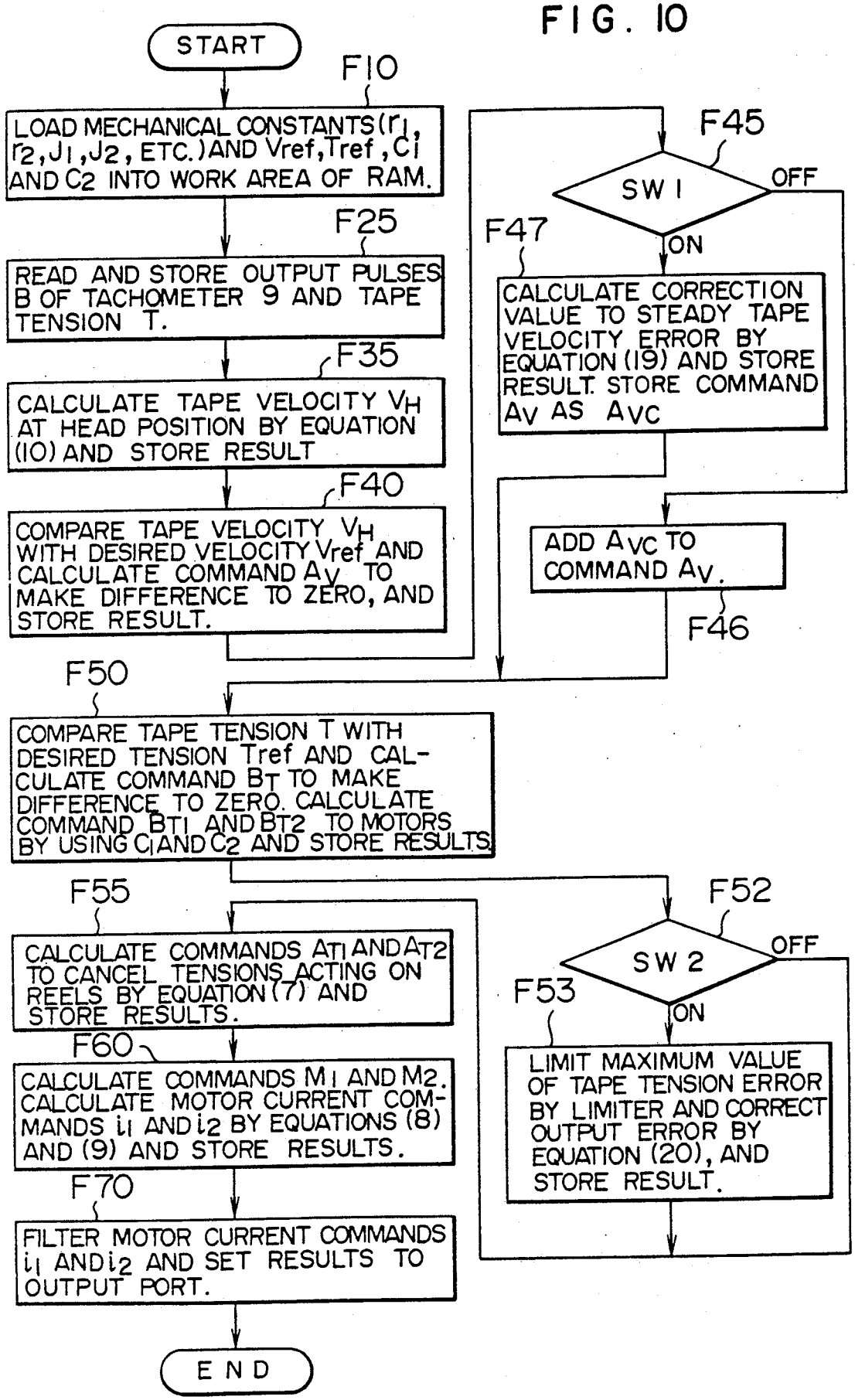
FIG. 10 shows an operational flow chart of another embodiment of the present invention.

FIG. 10 shows an operational flow chart of another embodiment. The configuration is identical to that of the embodiment of FIG. 5 and the explanation thereof is omitted. The steps F10 to F40 of FIG. 10 are identical to those of the embodiment of FIG. 5 and the explanation thereof is omitted.

In a step F45, after the tape velocity $V_H$ has been accelerated to a vicinity of the desired velocity $V_{ref}$, a steady velocity error from the desired velocity $V_{ref}$ is determined, and if the error exceeds a predetermined value, a switch SW1 is switched from an OFF position to an ON position. Immediately after power-on and immediately after the loading of the tape, the switch SW1 is set in the OFF position.

If the switch SW1 is in the OFF position, a step F46 is executed. In the step F46, a correction value $A_{vc}$ to correct the steady velocity error is added to the command $A_v$ which corrects the tape velocity. The correction value $A_{vc}$ is stored together with a signal which indicates the direction of tape travel.

If the switch SW1 is in the ON position, a step F47 is executed. In the step F47, the step F40 is reset and a function to correct the steady velocity error is added to the step, and the result is stored. The calculation after the switching is shown by the equation (19).

$$A_v = K_1 \alpha \int (V_{ref} - V_H) dt + (K_1 + \alpha)(V_{ref} - V_H) \tag{19}$$

where

α: gain constant

The result $A_v$ of the equation (19) is stored as the correction value $A_{vc}$ together with the signal which indicates the direction of tape travel.

Then, a step F50 is executed. The step F50 is identical to the step F50 of FIG. 2 and the explanation thereof is omitted.

In the next step F52, after the tape velocity $V_H$ has been accelerated to the vicinity of the desired velocity $V_{ref}$, a steady tension error from the desired tension $T_{ref}$ is determined, and if the error exceeds a predetermined value, a switch SW2 is switched from an OFF position to an ON position. Immediately after power-on and immediately after the loading of the tape, the switch SW2 is set to the OFF position. Then, a step F55 is executed. The steps F55 to F70 are identical to those of the embodiment of FIG. 2 and the explanation thereof is omitted.

When the switch SW2 is in the ON position a step F53 is executed. In the step F53, the step F50 is reset and a function to correct the steady tension error is added to the step, and the result is stored. The calculation after the switching is shown in the equation (20).

$$B_T = -K_2 \frac{dT}{dt} + K_3 \beta \int T dt - \frac{\beta}{C_1} \frac{dT}{dt} + (K_3 + K_2 \beta)T \quad (20)$$

where

T': limiter output of tension error ($T_{ref}$-T)

β: gain constant

During an acceleration period in which the tape is accelerated from a stationary state to the desired velocity $V_{ref}$ or during a deceleration period, a large variation in the tension is created due to the acceleration or deceleration, and the detection of a correct steady tension error cannot be detected. Accordingly, the switch SW2 should be turned off. If a limiter is provided to limit a maximum value of the tension error, the switch SW2 may be kept ON even during the acceleration or deceleration period. The limit level of the limiter is preferably set to be slightly higher than the steady tension error.

Then, the step F55 is executed. The steps F55 to F70 are identical to those of the embodiment of FIG. 2 and the explanation thereof is omitted.

In accordance with the present embodiment, the steady tape velocity error and steady tension error at the head position which vary from apparatus to apparatus can be stably and exactly corrected for a particular apparatus.

In accordance with the present invention, the tape velocity at the magnetic head position can be set to any velocity at any tape tension without being affected by the tape tension. Even if the tension is varied, the tape velocity at the magnetic head position is not affected. Further, even if the tape velocity is varied, the tape tension is not affected.

In accordance with the control method of the present invention, when the tape velocity at the magnetic head position cannot be directly measured, the tape velocity at the magnetic head position is estimated by using the coefficients $C_1$ and $C_2$ including the distances between the reels and the magnetic head as variables to determine the current commands to the reels so that the tape velocity at the magnetic head position can be exactly controlled.

We claim:

1. A method for controlling reel-to-reel tape transportation, wherein a tape is unwound from a supply reel and transported along a tape transport path without passing through a tape buffer to a take-up reel and taken up on the take-up reel using one motor for driving the supply reel and another motor for driving the take-up reel independently of the supply reel, and wherein information is written on the tape or read from the tape using a head disposed in the tape transport path between the supply reel and the take-up reel, comprising the steps of:

storing a length of the tape transport path from a point where the tape is unwound from the supply reel to the center of the head, and a length of the tape transport path from a point where the tape is taken up on the take-up reel to the center of the head;

determining a velocity of the tape being unwound from the supply reel, and a velocity of the tape being taken up on the take-up reel;

calculating the velocity of the tape at the center of the head using the stored tape transport path lengths and at least one of the determined tape velocities; and controlling a speed of at lest one of the motors to reduce a difference between the calculated velocity of the tape at the center of the head and a desired velocity of the tape at the center of the head wherein the velocity of the tape at the center of the head, $v_H$ is calculated in accordance with the following formula $$v_H = \frac{l_2}{l_1 + l_2} V_1 + \frac{l_1}{l_1 + l_2} V_2$$

wherein $l_1$ is the length of the tape transport path from the point where the tape is taken up on the take-up reel to the center of the head, $l_2$ is the length of the tape transport path from the point where the tape is unwound from the supply reel to the center of the head, $V_1$ is the determined velocity of the tape being taken up on the take-up reel, and $V_2$ is the determined velocity of the tape being unwound from the supply reel.

2. A method for controlling reel-to-reel tape transportation according to claim 1, wherein the tape velocity $V_1$ and the tape velocity $V_2$ l are determined in accordance with the following formulas:

$$V_1 = \omega_1 \times r_1$$

$$V_2 = \omega_2 \times r_2$$

wherein $\omega_1$ is an angular velocity of the take-up reel, $\omega_2$ is an angular velocity of the supply reel, $r_1$ is a radius from the center of the take-up reel to an outermost periphery of the tape on the take-up reel, and $r_2$ is a radius from the center of the supply reel to an outermost periphery of the tape on the supply reel.

3. A method for controlling reel-to-reel tape transportation, wherein a tape is unwound from a supply reel and transported along a tape transport path without passing through a tape buffer to a take-up reel and taken up on the take-up reel using one motor for driving the supply reel and another motor for driving the take-up reel independently of the supply reel, and wherein information is written on the tape or read from the tape using a head disposed in the tape transport path between the supply reel and the take-up reel, comprising the steps of:

storing a length of the tape transport path from a point where the tape is unwound from the supply reel to the center of the head, and a length of the tape transport path from a point where the tape is taken up on the take-up reel to the center of the head;

determining at least one of a velocity of the tape being unwound from the supply reel, and a velocity of the tape being taken up on the take-up reel;

detecting a tension of the tape at a point in the tape transport path between the supply reel and the take-up reel, calculating the velocity of the tape at the center of the head using the stored tape path lengths, the detected tape tension, and at least one of the at least one determined tape velocity; and controlling a speed of at least one of the motors to reduce a difference between the calculated tape velocity at the center of the head and a desired tape velocity at the center of the head wherein the velocity of the tape at the center of the head, $v_H$ is calculated in accordance with the following formula $$v_H = \frac{l_2}{l_1 + l_2} V_1 + \frac{l_1}{l_1 + l_2} V_2$$

wherein $l_1$ is the length of the tape transport path from the point where the tape is taken up on the take-up reel to the center of the head, $l_2$ is the length of the tape transport path from the point where the tape is unwound from the supply reel to the center of the head, $V_1$ is the determined velocity of the tape being taken up on the take-up reel, and $V_2$ is the determined velocity of the tape being unwound from the supply reel.

4. A method for controlling reel-to-reel tape transportation according to claim 3, wherein the step of detecting the tape tension includes detecting the tape tension using a tape tension sensor disposed in the tape transport path between the supply reel and the take-up reel.

5. A method for controlling reel-to-reel tape transportation according to claim 3, wherein the velocity of the tape being unwound from the supply reel is determined using an angular velocity of the supply reel and a radius from the center of the supply reel to an outermost periphery of the tape on the supply reel, and/or the velocity of the tape being taken up on the take-up reel is determined using an angular taken upon the take-up reel and a radius from the center of the take-up reel to an outermost periphery of the tape on the take-up reel.

6. An apparatus for controlling reel-to-reel tape transportation, wherein a tape in unwound from a supply reel and transported along a tape transport path without passing through a tape buffer to a take-up reel and taken up on the take-up reel using one motor for driving the supply reel and another motor for driving the take-up reel independently of the supply reel, and wherein information is written on the tape or read from the tape using a head disposed in the tape transport path between the supply reel and the take-up reel, comprising:

means for storing a length of the tape transport path from a point where the tape is unwound from the supply reel to the center of the head, and a length of the tape transport path from a point where the tape is taken up on the take-up reel to the center of the head;

means for determining a velocity of the tape being unwound from the supply reel, and a velocity of the take being taken up on the take-up reel;

means for calculating a velocity of the tape at the center of the heat using the stored tape path lengths and at least one of the determined tape velocities; and means for controlling a speed of at least one of the motors to reduce a difference between the calculated velocity of the tape at the center of the head and a desired velocity of the tape at the center of the head wherein the velocity of the tape at the center of the head, $v_H$ is calculated in accordance with the following formula $$v_H = \frac{l_2}{l_1 + l_2} V_1 + \frac{l_1}{l_1 + l_2} V_2$$

wherein $l_1$ is the length of the tape transport path from the point where the tape is taken up on the take-up reel to the center of the head, $l_2$ is the length of the tape transport path from the point where the tape is unwound from the supply reel to the center of the head, $V_1$ is the determined velocity of the tape being taken up on the take-up reel, and $V_2$ is the determined velocity of the tape being unwound from the supply reel.

7. An apparatus for controlling reel-to-reel tape transportation, wherein a tape is unwound from a supply reel and transported along a tape transport path without passing through a tape buffer to a take-up reel and taken up on the take-up reel using one motor for driving the supply reel and another motor for driving the take-up reel independently of the supply reel, and wherein information is written on the tape or read from the tape using a head disposed in the tape transport path between the supply reel and the take-up reel, comprising:

means for storing a length of the tape transport path from a point where the tape is unwound from the supply reel to the center of the head, and a length of the tape transport from a point where the tape is taken up on the take-up reel to the center of the head;

means for determining at least one of a velocity of the tape being unwound from the supply reel, and a velocity of the tape being taken up on the take-up reel;

means for detecting a tension of the tape at a point in the tape transport path between the supply reel and the take-up reel;

means for calculating a velocity of the tape at the center of the head using the stored tape path lengths, the detected tape tension, and at least one of the at least one determined tape velocity; and means for controlling a speed of at least one of the motors to reduce a difference between the calculated velocity of the tape at the center of the head and a desired velocity of the tape at the center of the head wherein the velocity of the tape at the center of the head, $v_H$ is calculated in accordance with the following formula $$V_H = \frac{l_2}{l_1 + l_2} V_1 + \frac{l_1}{l_1 + l_2} V_2$$

wherein $l_1$ is the length of the tape transport path from the point where the tape is taken up on the take-up reel to the center of the head, $l_2$ is the length of the tape transport path from the point where the tape is unwound from the supply reel to the center of the head, $V_1$ is the determined velocity of the tape being taken up on the take-up reel, and $V_2$ is the determined velocity of the tape being unwound from the supply reel.

* * * * *